United States Patent
Yatsu et al.

(10) Patent No.: US 7,222,965 B2
(45) Date of Patent: May 29, 2007

(54) OPTICAL UNIT AND A PROJECTION IMAGE DISPLAY APPARATUS USING THE SAME

(75) Inventors: Masahiko Yatsu, Fujisawa (JP); Tsutomu Nakashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 10/916,991

(22) Filed: Aug. 11, 2004

(65) Prior Publication Data

US 2005/0140931 A1    Jun. 30, 2005

(30) Foreign Application Priority Data

Dec. 26, 2003   (JP)   ............... 2003-432678

(51) Int. Cl.
*G03B 21/14*   (2006.01)
*G03B 21/26*   (2006.01)
*G03B 21/28*   (2006.01)
*G03B 21/20*   (2006.01)
*G02F 1/1335*   (2006.01)
*G02B 5/30*   (2006.01)
*G02B 27/28*   (2006.01)
*G02B 27/14*   (2006.01)
*G02B 27/12*   (2006.01)
*H04N 5/74*   (2006.01)

(52) U.S. Cl. ............... 353/20; 353/31; 353/34; 353/37; 353/84; 353/99; 349/9; 349/96; 359/487; 359/495; 359/634; 359/637; 359/639; 348/750; 348/758

(58) Field of Classification Search ............ 353/33, 353/20, 31, 34, 37, 81, 82, 98, 99, 102, 84; 349/5, 7–9, 96; 359/483, 487, 494–497, 359/499, 501, 618, 629, 634, 637, 639; 348/744, 348/752, 750, 758, 759, 771
See application file for complete search history.

(56) References Cited

U.S. PATENT DOCUMENTS 5,562,334 A * 10/1996 Wortel ............... 353/69
6,450,645 B1   9/2002 Jeon
6,585,378 B2 *  7/2003 Kurtz et al. ............ 353/31

FOREIGN PATENT DOCUMENTS

| JP | 05-313119 | 11/1993 |
| JP | 09-114021 | 5/1997 |
| JP | 10-055037 | 2/1998 |
| JP | 2000-111862 | 4/2000 |
| JP | 2001-056449 | 2/2001 |

OTHER PUBLICATIONS

Translation of JP Patent No. 2000-111862.*

* cited by examiner

*Primary Examiner*—W. B. Perkey
*Assistant Examiner*—Rochelle Blackman
(74) *Attorney, Agent, or Firm*—Townsend and Townsend and Crew LLP

(57) ABSTRACT

The present invention provides a projection image display technology capable of correcting astigmatism due to use of a polarized-beam splitter, thus ensuring high-resolution projection images. A wire-grid polarized-beam splitter (or the like) of a flat-plate-like structure is used as a polarized-beam splitter, and an astigmatism correction element, such as a cylindrical lens, is provided between the polarized-beam splitter and a projection lens unit.

9 Claims, 13 Drawing Sheets

OCCURRENCE OF ASTIGMATISM

CORRECTION OF ASTIGMATISM

SOLID LINE : S-POLARIZED LIGHT
BROKEN LINE : P-POLARIZED LIGHT

TO PROJECTION LENS 22

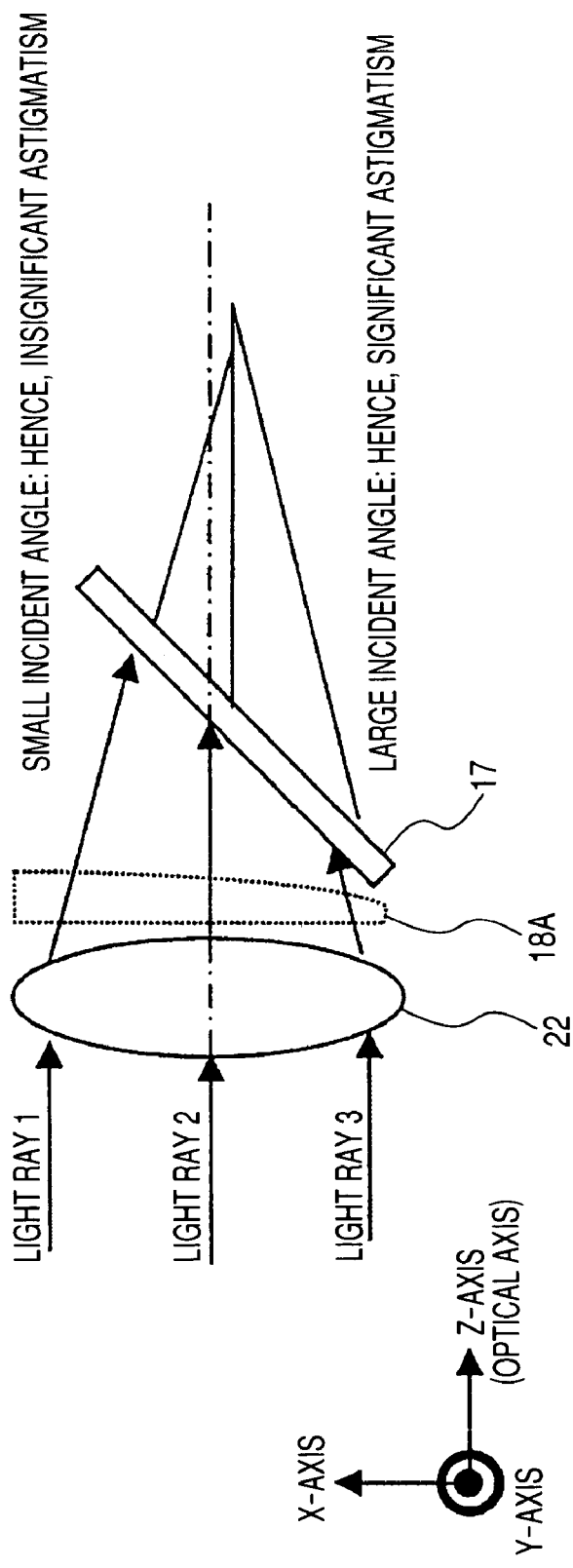

OPTICAL UNIT AND A PROJECTION IMAGE DISPLAY APPARATUS USING THE SAME

CLAIM OF PRIORITY

The present application claims priority from Japanese application serial no. P2003-432678, filed on Dec. 26, 2003, the content of which is hereby incorporated by reference into this application.

BACKGROUND OF THE INVENTION

The present invention relates to an astigmatism correction technology for a projection image display apparatus which irradiates light from a light source onto such a light valve as that of a liquid-crystal panel, forms optical images in response to image signals, and provides an enlarged projection of the images.

Conventional technologies for splitting polarized light, related to the present invention, include those described in Japanese Patent Application Laid-Open Publication Nos. 2001-56449 and Hei 10-55037. In addition, conventional related technologies for correcting astigmatism include those described in Japanese Patent Application Laid-Open Publication Nos. Hei 5-313119, Hei 9-114021, and 2000-111862.

Japanese Patent Application Laid-Open Publication Nos. 2001-56449 and Hei 10-55037 each disclose an arrangement with three sets of reflection-type light valves and polarization beam splitter, each set being for red (R), green (G), and blue (B), wherein light components of each of the R, G, and B colors are color-synthesized via a cross dichroic prism. Polarized light is split using, for example, a polarized beam splitter (PBS) prism with PBS formed as a dielectric multi-layer film on the interface between two rectangular prisms, or a wire-grid polarized-beam splitter having a wire-grid-structured diffraction grating formed on a light-transmissive substrate.

Japanese Patent Application Laid-Open Publication No. Hei 5-313119 discloses a technology in which a flat-plate-like dichroic mirror for conducting color syntheses is transformed into a wedge-like dichroic mirror to correct the astigmatism occurring when light passes through the flat-plate-like dichroic mirror. Japanese Patent Application Laid-Open Publication No. Hei 9-114021 discloses an arrangement in which a field lens having an astigmatism correction function is disposed at the exit side of a liquid-crystal panel to correct astigmatism due to the use of a dichroic mirror. Japanese Patent Application Laid-Open Publication No. 2000-111862 discloses a technology in which the thickness and inclination of the flat-plate-like dichroic mirror for the color components of light that is disposed on a front face of a panel and acts as a polarizer/analyzer, are adjusted to correct astigmatism due to the use of the dichroic mirror.

SUMMARY OF THE INVENTION

The PBS prism described in Japanese Patent Application Laid-Open Publication No. 2001-56449 is excellent in terms of polarized-beam splitting action against the light rays entering vertically (at an incident angle of 45 degrees to a polarized-beam splitting surface), that is, large in light extinction ratio. However, if the F-value of the illumination optics used is F3, even when telecentricity is controlled, there will exist rays expressed as $\tan^{-1}\frac{1}{2}F = \tan^{-1}\frac{1}{6} = 9.5°$. Accordingly, since the polarized-beam splitting film is low in light extinction ratio against rays of such an angle, the apparatus deteriorates in contrast performance.

For a wire-grid polarized-beam splitter, however, although the peak itself of the light extinction ratio obtained at the same incident angle of 45 degrees as above is not great, since the extinction ratio against light rays of a large angle does not deteriorate too significantly, the flux as a whole improves in contrast performance. The wire-grid polarized-beam splitter, however, has the following problems:

Two methods are available to dispose the wire-grid polarized-beam splitter on an optical path through which the flux of light reflected from a reflection-type, light valve enters a projection lens unit. FIGS. 12A and 12B show methods of the disposition. In the disposition method of FIG. 12A, the incident flux of S-polarized light from illumination optics reflects at a wire-grid polarized-beam splitter 17 and enters a reflection-type light valve 214. The light is converted into P-polarized light at the reflection-type light valve 214, and the exit light (reflected light) generated by exit of the P-polarized light from the reflection-type light valve 214 passes through the polarized-beam splitter 17 and is directed toward a reflecting lens unit (not shown). Hereinafter, such deposition is referred to as transmissive deposition, since the reflected light from the reflection-type light valve passes through the wire-grid polarized-beam splitter and is directed toward the projection lens unit. In the disposition method of FIG. 12B, the incident flux of P-polarized light from illumination optics passes through a wire-grid polarized-beam splitter 17 and enters a reflection-type light valve 217. The exit light (reflected light) generated by conversion into S-polarized light at the reflection-type light valve 217 reflects at the wire-grid polarized-beam splitter 17 and is directed toward a reflecting lens unit (not shown). Hereinafter, such deposition is referred to as reflective deposition, since the reflected light from the reflecting light unit further reflects at the wire-grid polarized-beam splitter and is directed toward the projection lens unit.

Reflective disposition of the wire-grid polarized-beam splitter shown in FIG. 12B could deteriorate projection performance if the wire-grid polarized-beam splitter shifts in position or suffers deformation due to thermal expansion of the splitter itself. Transmissive deposition of the wire-grid polarized-beam splitter shown in FIG. 12A could also deteriorate projection performance since passage through the flat-plate-like wire-grid polarized-beam splitter is likely to result in astigmatism.

FIG. 11 shows an arrangement in which the PBS prism in Japanese Patent Application Laid-Open Publication No. Hei 10-55037, for example, is used instead of the wire-grid polarized-beam splitter mentioned above. In FIG. 11, however, an integrator of multi-lens array type is used alternatively to an integrator of rod lens type and a plane of incidence of R-light and B-light components of a cross dichroic prism which conducts a color synthesis is equipped with a ½-wavelength plate for improved efficiency of the color synthesis.

In FIG. 11, the polarized-beam splitter constituted by wire-grid polarized-beam splitters reflect a flux of S-polarized light and transmits a flux of P-polarized light. Therefore, the flux of the S-polarized light which has entered reflection-type light valves 21 (211, 212, 213) reflects as P-polarized light when the pixels (not shown) that constitute the reflection-type light valves 21 are in an ON state. Accordingly, astigmatism occurs when the light passes through the flat-plate-like wire-grid polarized-beam splitters 17 (171, 172, and 173).

It is obvious that the dichroic mirror astigmatism correction technologies described in Japanese Patent Application Laid-Open Publication Nos. Hei 5-313119, Hei 9-114021, and 2000-111862 do not suffice to correct astigmatism due to the use of the flat-plate-like polarized-beam splitter mentioned above.

The present invention was made in view of the situation of the foregoing conventional technologies, and a challenge of the invention is to allow sufficient correction of the astigmatism caused by use of flat-plate-like polarized-beam splitter in a projection image display technology.

An object of the present invention is to provide a projection image display technology capable of fulfilling the above challenge and obtaining images with high resolution.

To fulfill the above challenge, the present invention provides a projection image display technology for irradiating light in a polarized and converted form from a light source onto a light valve, forming optical images in response to image signals, and providing enlarged projection of the images. In this technology, flat-plate-like polarized-beam splitter for at least polarized-beam splitting the light forming an optical image sent from the light valve is used and astigmatism correction element such as a cylindrical lens for correcting astigmatism of the optical image by use of the above-mentioned polarized-beam splitter is provided between the polarized-beam splitter and a projection lens unit.

According to the present invention, even when flat-plate-like polarized-beam splitter is used in the transmissive disposition scheme for a projection image display apparatus, it is possible to correct astigmatism due to use of the polarized-beam splitter. High resolution is thus achievable. Futher, the response inheriting the basic configuration of a conventional apparatus is possible and this, in turn, makes it possible to improve performance with minimum production costs.

BRIEF DESCRIPTION OF THE DRAWINGS

FIG. 13 is a diagram showing an image-forming model of a reduction system which uses a reflection-type light valve as an image surface.

DETAILED DESCRIPTION OF THE PREFERRED EMBODIMENTS

Preferred embodiments of the present invention are described below using the accompanying drawings.

Figure 10:
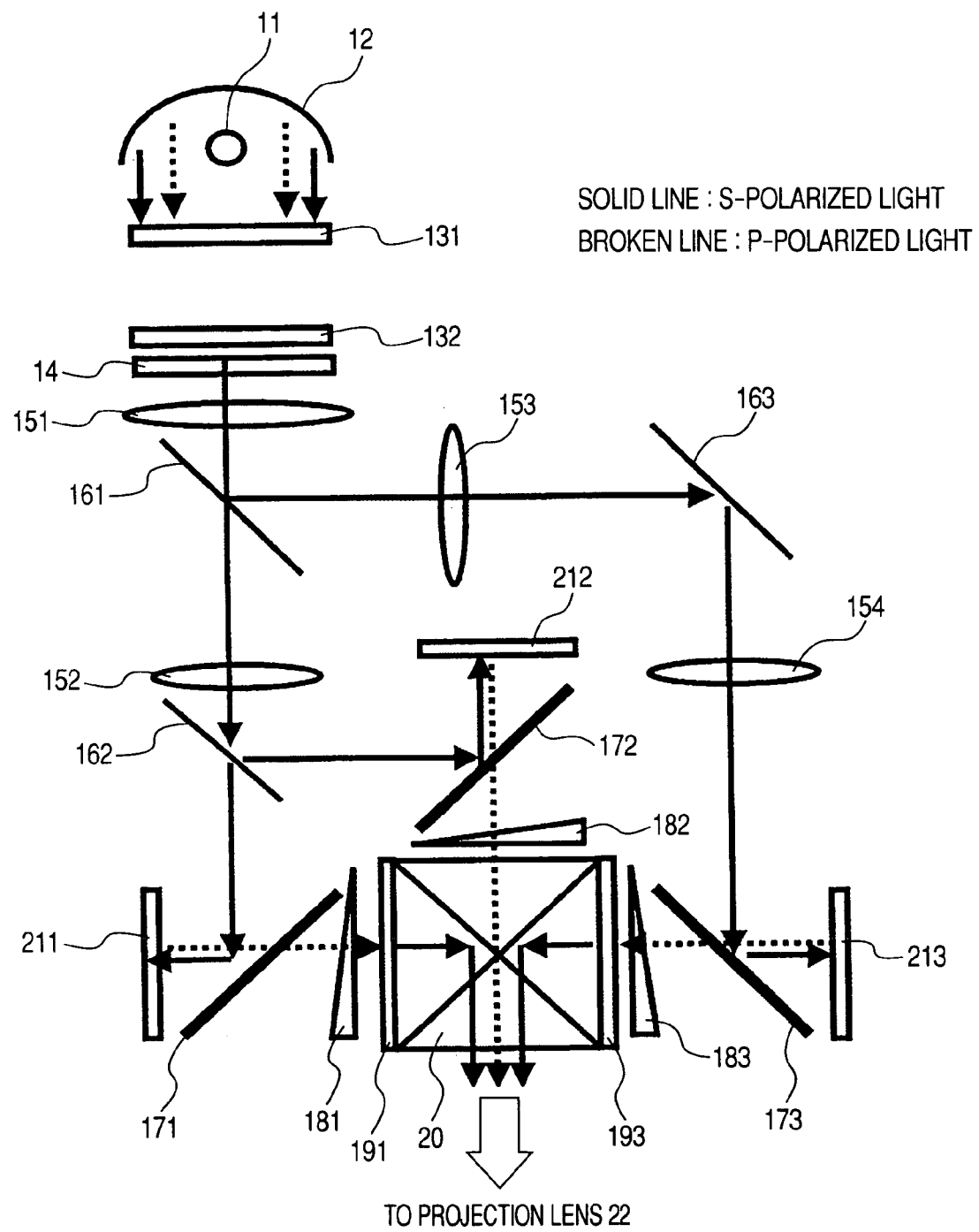
FIG. 10 is a diagram showing a configuration example of a liquid-crystal projector apparatus in an embodiment of the present invention.
Figure 11:
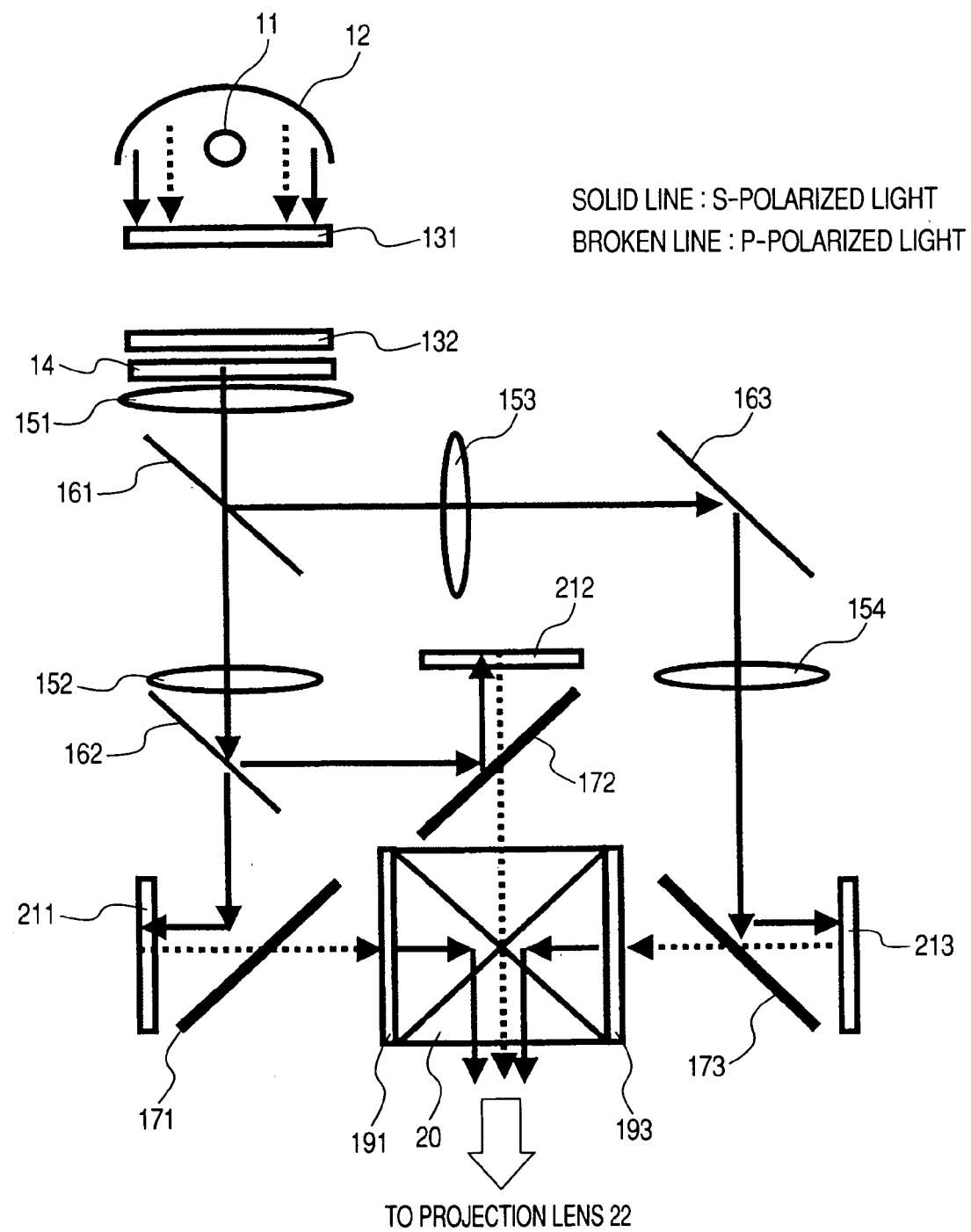
FIG. 11 is a diagram showing a configuration example of a liquid-crystal projector apparatus which uses polarized-beam splitter.
Figure 12A:
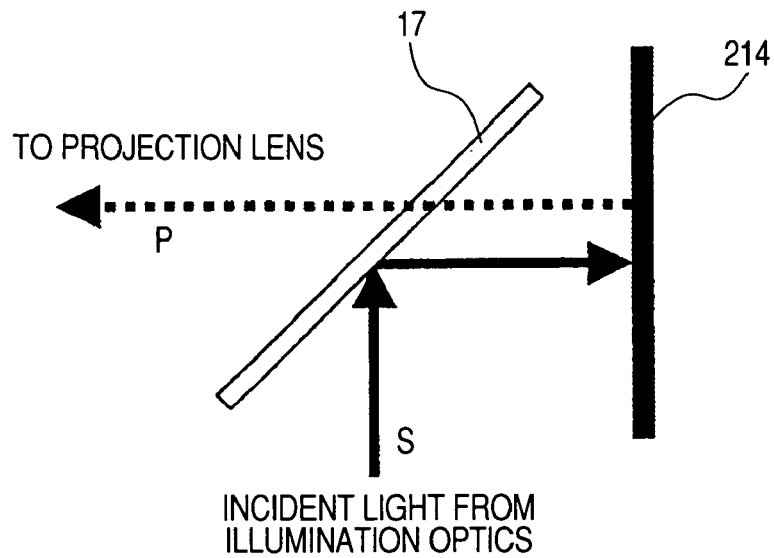
FIGS. 12A and 12B are diagrams showing disposition examples of polarized-beam splitter.
Figure 12B:
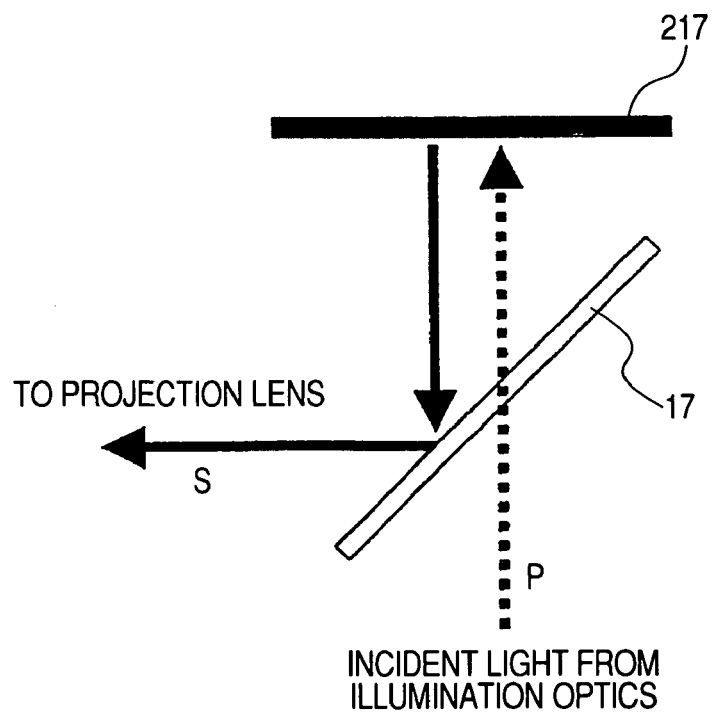

FIGS. 1A, 1B and FIGS. 2A, 2B, 2C are diagrams explaining the configuration and operation, respectively, of a major section in an embodiment of the present invention. FIG. 10 is a diagram showing a configuration example of the liquid-crystal projector apparatus used as a projection image display apparatus in another embodiment of the present invention. The same symbol is assigned to sections each having the same function in each of the figures.

Figure 1A:
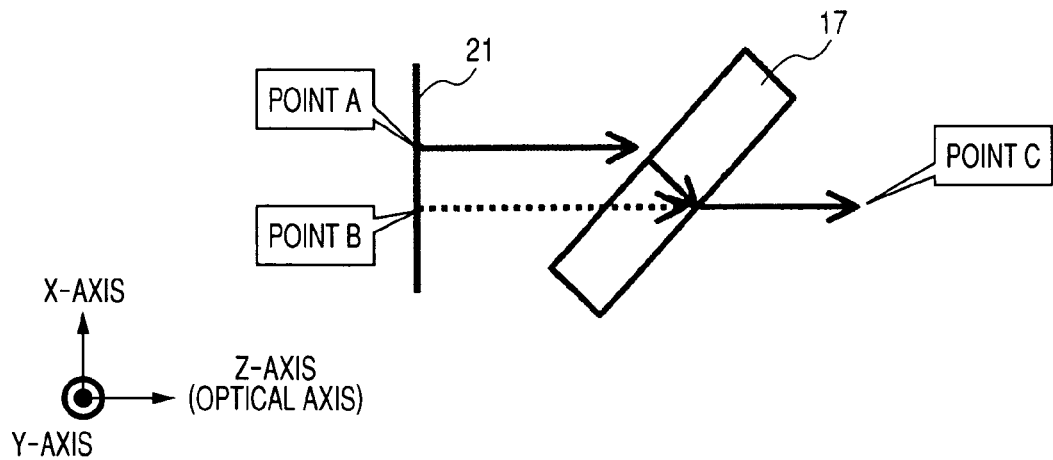
FIGS. 1A and 1B are configuration diagrams of a major section in an embodiment of the present invention.
Figure 1B:
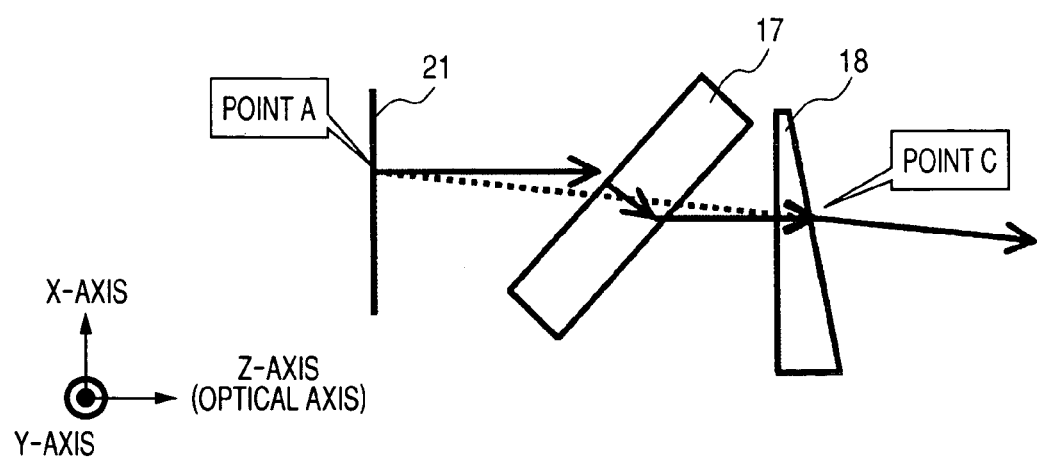
Figure 2A:
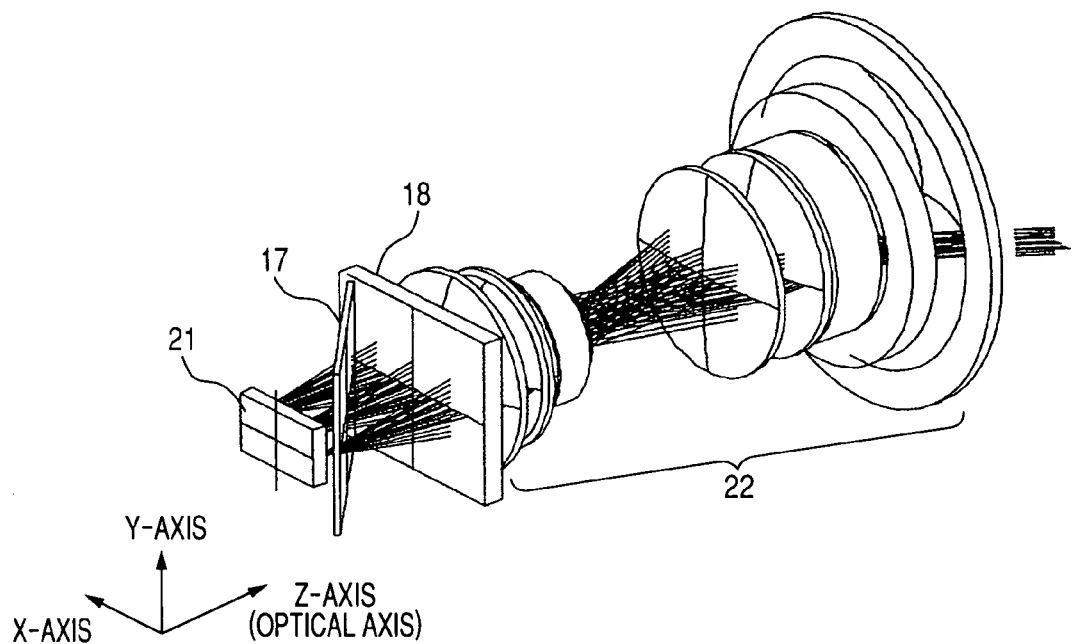
FIGS. 2A, 2B, and 2C are light-ray diagrams showing light rays in the above embodiment of the present invention.
Figure 2B:
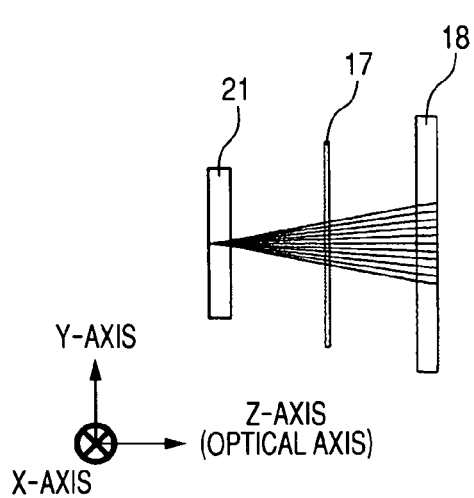
Figure 2C:
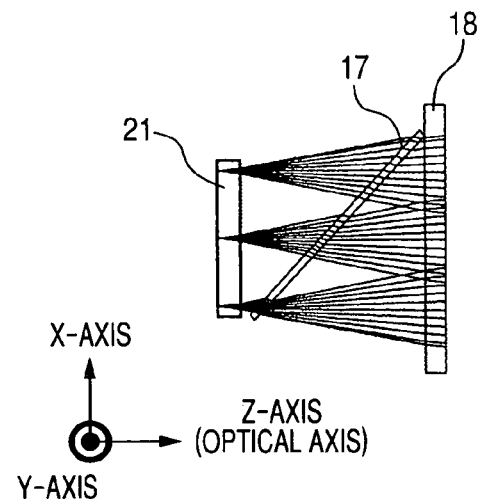

FIGS. 1A and 1B are schematic configuration diagrams of a major section having a wire-grid polarized-beam splitter obliquely disposed as a flat-plate-like polarized-beam splitter. FIGS. 2A, 2B, and 2C show the light rays in the major section of FIG. 1 and are also a perspective view, a Y-Z cross-sectional view, and an X-Z cross-sectional view, respectively, of the obliquely disposed wire-grid polarized-beam splitter.

In FIGS. 2A and 2C, a wire-grid polarized-beam splitter 17 is disposed about 45 degrees inclinedly with respect to a reflection-type light valve 21 disposed on an X-Y plane. Therefore, a Y-Z section of the wire-grid polarized-beam splitter 17 is, as shown in FIG. 2B, orthogonal to a Z-axis that is an optical axis. An X-Z section of the polarized-beam splitter 17 is, as shown in FIG. 2C, inclined at an angle of about 45 degrees to the Z-axis, the optical axis.

Since the wire-grid polarized-beam splitter 17 is disposed as above, astigmatism occurs in the X-Z section, i.e., in an X-axis direction, and no astigmatism occurs in the Y-Z section, i.e., in a Y-axis direction.

In the present invention, therefore, an astigmatism correction element 18 (detailed later) for correcting the astigmatism occurring in the X-Z section, i.e., in the X-axis direction, is disposed at the rear of the wire-grid polarized-beam splitter 17. Astigmatism-corrected image light is projected onto a screen (not shown) via a projection lens unit 22. In FIGS. 2A to 2C, a color-synthesizing element, a ½-wavelength plate for changing a polarizing direction, associated with the color-synthesizing element, and other elements are omitted for simplified description and calculation.

First, how astigmatism occurs, and its correction principles are described below using FIGS. 1A and 1B. FIG. 1A shows a case in which the astigmatism correction element is not provided, and FIG. 1B shows a case in which the astigmatism correction element is provided.

In FIGS. 1A and 1B, if a point on an optical axis of the reflection-type light valve 21 is taken as point A, the light rays on the optical axis that have exited from point A suffer a refraction in the X-Z section by the wire-grid polarized-beam splitter 17. Consequently, the rays are formed into the exit rays shifting to a negative side (on the paper of FIGS. 1A and 1B, underside) of the X-axis. These exit rays become the rays that, to the projection lens unit, appear as if they had exited from point B. In other words, an image by the light flux that has exited from point A is formed at an image position associated with point B. In the Y-Z section, however, the rays described in FIGS. 1A and 1B do not shift since, as shown in FIG. 2B, a section of the wire-grid polarized-beam splitter 17 is orthogonal (perpendicular) to the Z-axis that is the optical axis. For this reason, the image by the light flux that has exited from point A is formed at an image position associated with point A. This event due to a shift between the image position in the X-Z section (X-axis direction) and the image position in the Y-Z section (Y-axis direction) is referred to as astigmatism (astigmatic difference).

Next, the correction principles of astigmatism are described below. FIG. 1B is a configuration diagram of a major section in which the astigmatism correction element 18 is disposed at point C to correct the astigmatism caused by use of the wire-grid polarized-beam splitter 17. Since the rays that exited from point A of the reflection-type light valve 21 shift to the negative side of the X-axis (i.e., on the paper of the figure, underside), the astigmatism correction element 18 is formed thinly at a positive side of the X-axis and thickly at the negative side thereof. For a prism or the like, a direction of light rays can be bent clockwise (in the figure, in a right-downward direction). Matching the resulting angle to an angle formed by connecting points A and C makes the exit rays from point A also appear to the projection lens unit as the exit rays from point A.

Next, a description based on Snell's law is given below using FIG. 13. FIG. 13 is a diagram showing an image-forming model of a reduction system which uses a reflection-type light valve as an image surface.

In FIG. 13, the light rays that have entered a wire-grid polarized-beam splitter 17 via a projection lens unit 22 are refracted on planes of incidence/exit in accordance with Snell's law. Exit rays parallel to the incident rays are obtained as a result. This event is called the X-axial movement due to astigmatism. A distance of the X-axial movement is determined by Snell's law and therefore differs according to a particular angle of incidence on the wire-grid polarized-beam splitter 17. For example, in FIG. 13, since light rays 1, 2, and 3 enter the wire-grid polarized-beam splitter 17 at a greater angle in that order, X-axial movement distances of the light rays 1, 2, and 3 also increase in that order. Accordingly, compared with a crossing point of the light rays 1 and 2, that of the light rays 2 and 3 shifts to a plus side of the Z-axis (i.e., in the figure, the right). This event is called the Z-axial movement of an image-forming position due to astigmatism. A distance of the Z-axial movement can be adjusted by disposing an optical element that adds a greater converging action to light ray 2 than to light ray 1 and adds an even greater action to light ray 3 than to light ray 2. More specifically, the optical element disposed can be a cylindrical lens 18A (shown with a dotted line) that provides, in the X-Z section of the configuration shown in FIG. 13, a convex lens action eccentric to the light ray 1.

Refraction of actual light rays at this cylindrical lens also increases in magnitude in order of the distance from an optical axis of the cylindrical lens. That is, the light rays 1, 2, and 3 more distant in that order from the optical axis are refracted more significantly in that order. The cylindrical lens is therefore suitable for correction of the Z-axis astigmatism occurring in the wire-grid polarized-beam splitter 17. It is known that rays more distant from an optical axis of a spherical ball are greater in terms of the spherical aberration of a spherical lens. This event occurs for the same reason as the reason that on-axis rays more distant from the optical axis of the spherical ball increase in incident angle and thus suffer greater refraction in accordance with Snell's law.

It follows from the above that since the optical element for X-axial correction and the optical element for Z-axial correction match to each other in terms of shape, it is appropriate to dispose the eccentric cylindrical lens.

X-axial astigmatism can be corrected by shifting X-axial relative positions of the reflection-type light valve and the projection lens unit. However, Z-axial astigmatism cannot be corrected by such shifting. Accordingly, Z-axial astigmatism is to be corrected mainly by using an action of the eccentric cylindrical lens, whereas X-axial astigmatism is to be corrected by shifting the X-axial relative positions of the reflection-type light valve and the projection lens unit.

Astigmatism is corrected in this way. In actual design of optics, it is also possible to employ an optimizing method that incorporates the relationship in X-axial relative position between the reflection-type light valve and the projection lens unit, into design parameters from an initial stage.

Next, examples showing the astigmatism correction element more specifically are described below.

Description is given below of a first example in which a cylindrical lens is used as the astigmatism correction element.

Figure 3A:
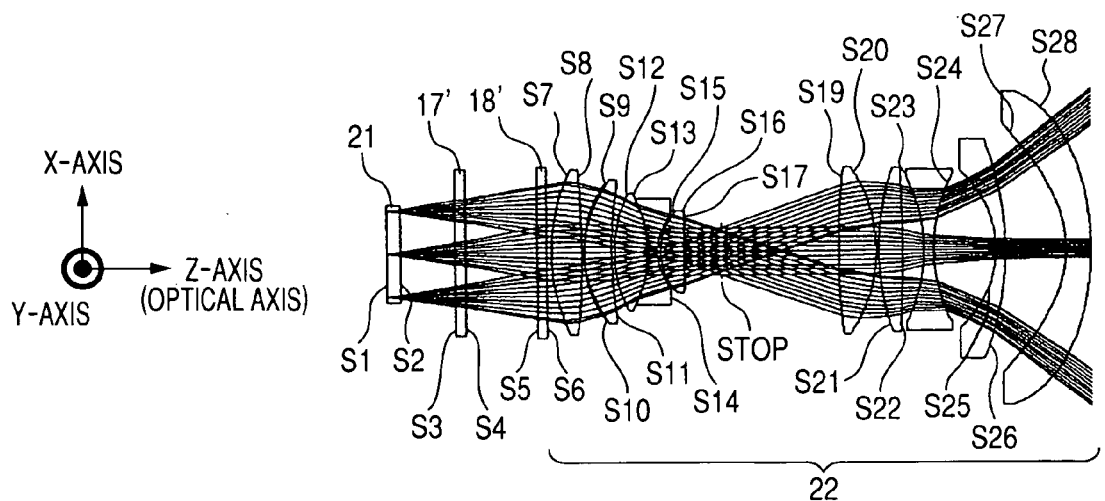
FIGS. 3A, 3B, and 3C are light-ray diagrams showing light rays before and after application of astigmatism correction element.
Figure 3B:
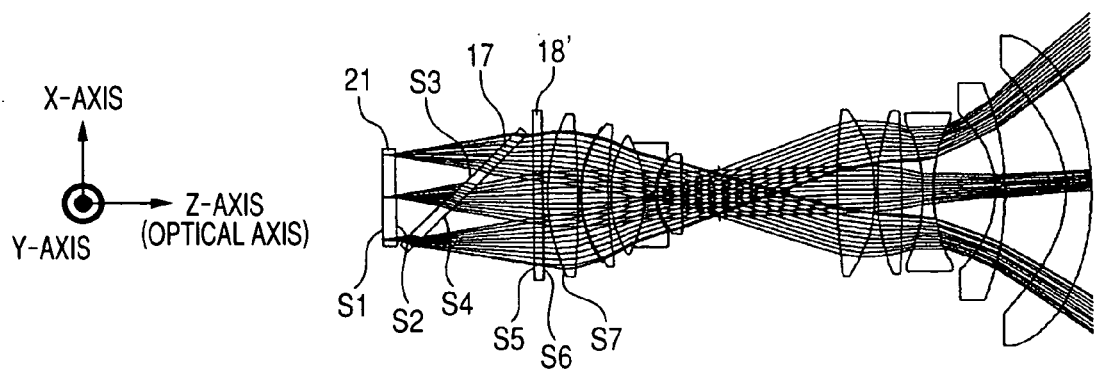
Figure 3C:
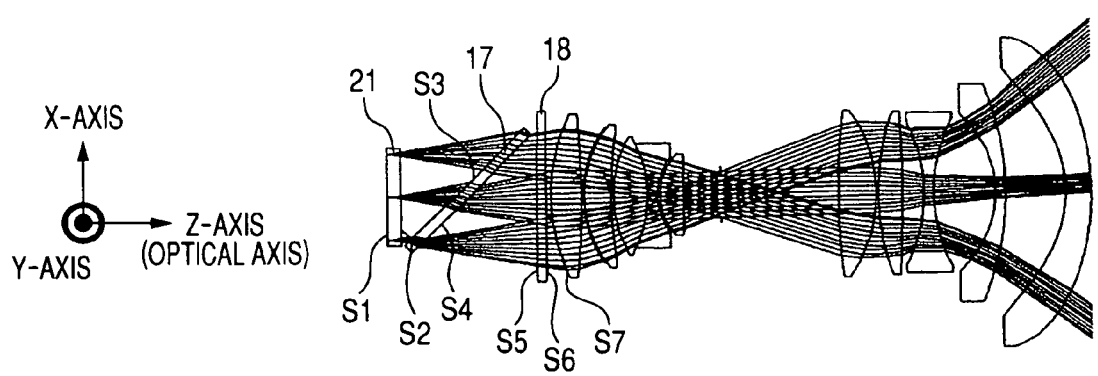
Figure 4:
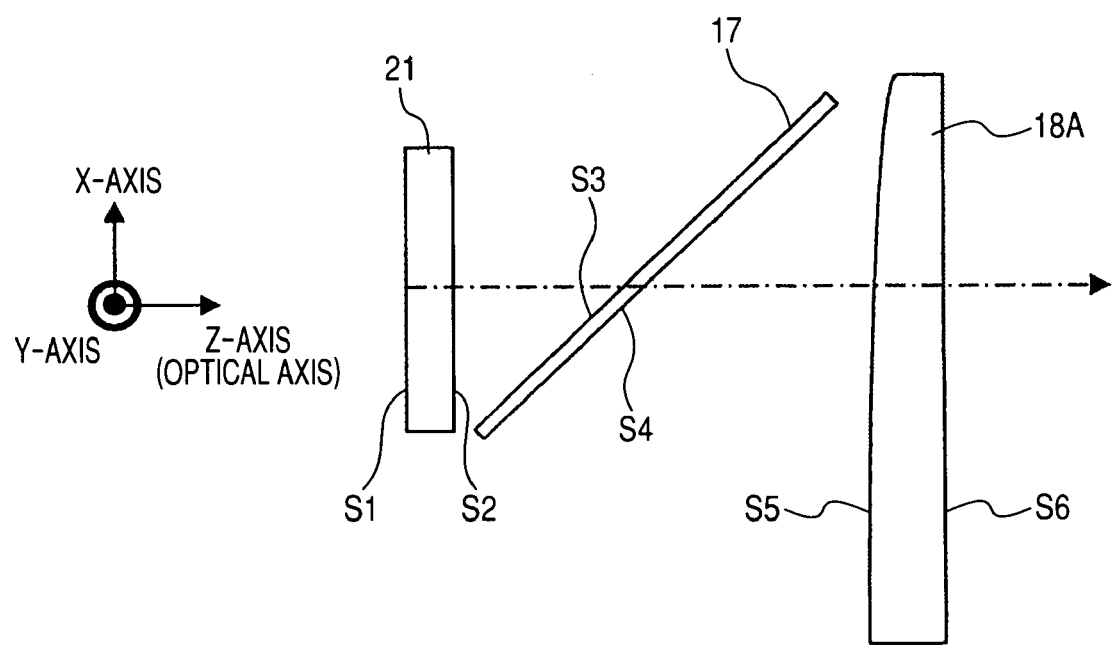
FIG. 4 is a schematic diagram of a cylindrical lens used as astigmatism correction element.
Figure 5A:
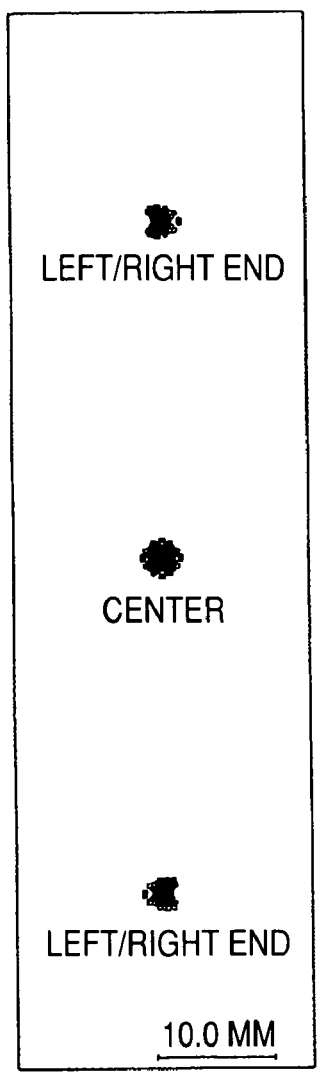
FIGS. 5A, 5B, and 5C are spot diagrams showing light rays before and after the application of the cylindrical lens in FIG. 4.
Figure 5B:
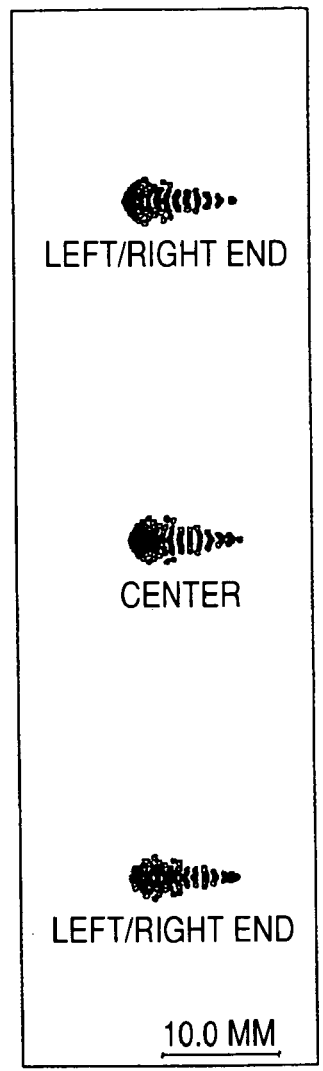
Figure 5C:
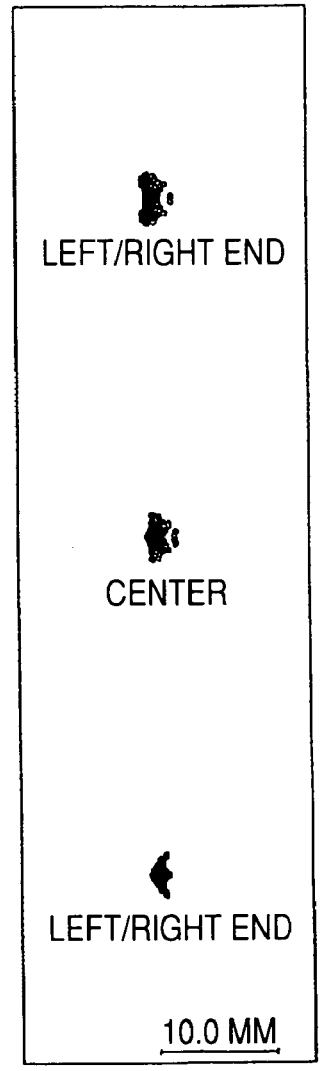
Figure 6A:
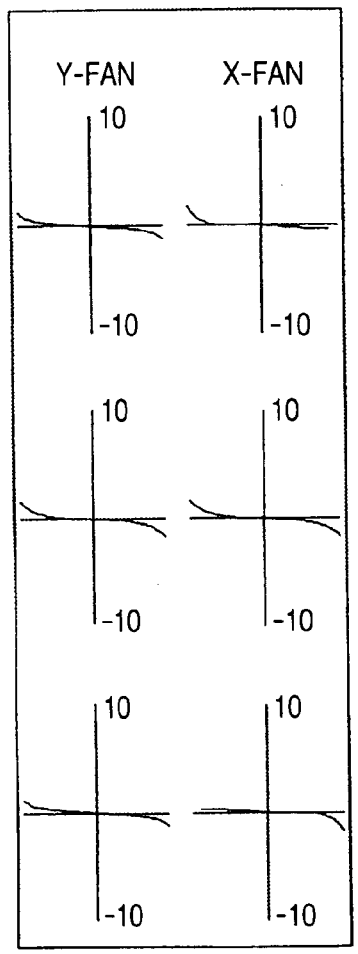
FIGS. 6A, 6B, and 6C are diagrams showing the aberration occurring before and after the application of the cylindrical lens in FIG. 4.
Figure 6B:
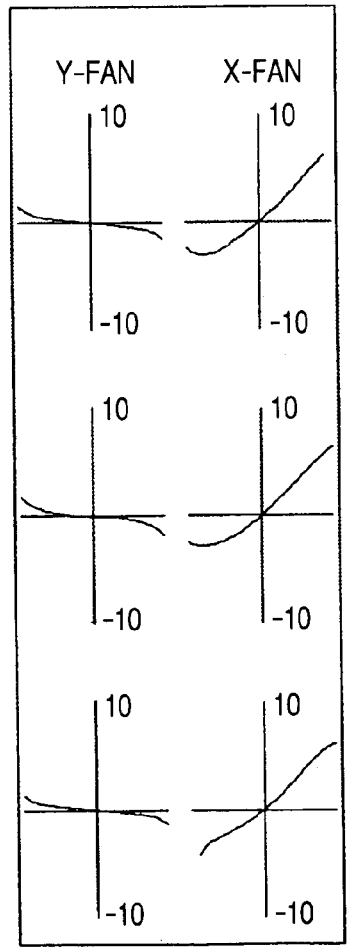
Figure 6C:
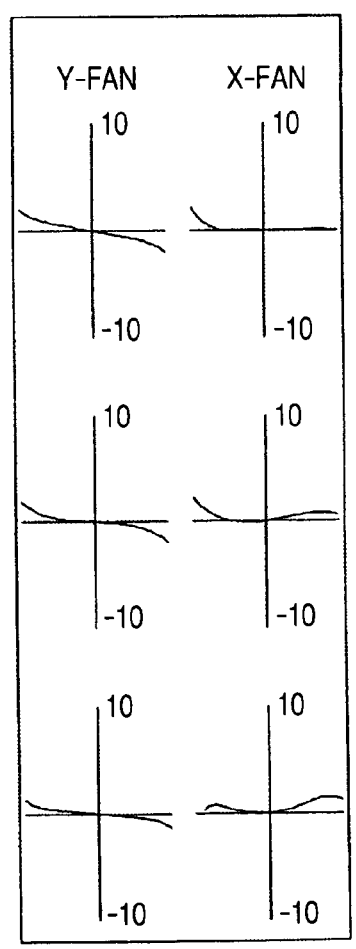

FIGS. 3A, 3B, and 3C are light-ray diagrams with a reflection-type light valve taken as an object surface, showing how light rays pass before and after application of an astigmatism correction element. FIG. 4 is a schematic diagram of a cylindrical lens used as an astigmatism correction element. FIGS. 5A, 5B, and 5C are spot diagrams showing how light rays pass before and after application of the cylindrical lens as the astigmatism correction element in the first embodiment. FIGS. 6A, 6B, and 6C are diagrams showing the aberration occurring before and after the application of the cylindrical lens as the astigmatism correction element. FIG. 3A is a diagram in which a flat plate 17' and a flat plate 18' are arranged as a dummy wire-grid polarized-beam splitter and a dummy astigmatism correction element, respectively, in parallel to the reflection-type light valve 21. FIG. 3B is a diagram in which the flat plate 17' in FIG. 3A is replaced with a wire-grid polarized-beam splitter 17, and FIG. 3C is a diagram in which the flat plate 18' in FIG. 3B is replaced with an astigmatism correction element 18. FIGS. 5A to 5C and 6A to 6C are associated with FIGS. 3A to 3C, respectively. Table 1 lists data of the projection lens unit 22 existing before an astigmatism correction element associated with FIG. 3A is used. Table 2 lists lens data (changes only) on a cylindrical lens 18A used as the astigmatism correction element of FIG. 4 that is associated with FIG. 3C.

TABLE 1A

| Surface | Radius of Curvature | Interface Distance | Glass Material | Aperture |
|---|---|---|---|---|
| Object Surface | ∞ | 0 | | |
| S1 | ∞ | 2.75 | 472000.66110 | |
| S2 | ∞ | 10.648805 | | |
| S3 | ∞ | 2 | BSC7 HOYA | |
| S4 | ∞ | 14.55 | | |
| S5 | ∞ | 2 | BSC7 HOYA | |
| S6 | ∞ | 1 | | |
| S7 | 39.674 | 6.04 | FDS90 HOYA | 15.675 |
| S8 | −186 | 0.5 | | 15.41 |
| S9 | 26.79736 | 0.1 | 520200.52000 | 13.725 |
| S10 | 23.628 | 5.52 | FCD1 HOYA | 13.615 |

TABLE 1A-continued

| Surface | Radius of Curvature | Interface Distance | Glass Material | Aperture |
|---|---|---|---|---|
| S11 | 85.7 | 0.51 | | 12.64 |
| S12 | 24.778 | 6.93 | FCD1 HOYA | 11.185 |
| S13 | −25.096 | 2 | EFD4 HOYA | 9.84 |
| S14 | 12.099 | 0.5 | | 7.52 |
| S15 | 12.03 | 4.84 | FCD1 HOYA | 7.5 |
| S16 | −5513.648 | 0.1 | 520200.52000 | 6.9 |
| S17 | 526.00202 | 7.6 | | 6.84 |
| Diaphragm | ∞ | 23.39 | | 4.785 |
| S19 | 144.61 | 7.49 | EADF50 HOYA | 15.495 |
| S20 | −31.151 | 0.52 | | 15.955 |
| S21 | 50.963 | 4.99 | FDS90 HOYA | 15.62 |
| S22 | −298.82 | 4.46 | | 15.255 |
| S23 | −31.969 | 2 | LAF2 SCHOTT | 14.81 |
| S24 | 32.19 | 12.58 | | 15.27 |
| S25 | −21.691 | 2 | BACD16 HOYA | 16.275 |
| S26 | −59.369 | 12.13 | | 21.04 |
| S27 | −24.1863 | 5 | PMMA | 25.58 |
| S28 | −56.8221 | 673.99 | | 30.95 |
| Image Surface | ∞ | 0 | | |

TABLE 1B

| Surface | R | K | A | B | C | D |
|---|---|---|---|---|---|---|
| S9 | 26.79736 | 1.356061 | −4.2809E−06 | 3.0827E−10 | −2.6015E−11 | 5.0804E−14 |
| S17 | 526.00202 | −6729.73686 | 4.4772E−05 | 1.7790E−07 | −1.9716E−09 | 1.1479E−11 |
| S27 | −24.1863 | −1.161402 | 4.0554E−07 | 5.4270E−10 | −8.8502E−12 | 1.2345E−14 |
| S28 | −56.8221 | 2.068172 | 9.0344E−07 | −2.1404E−09 | 1.1758E−12 | −2.7081E−16 |

Examples of data on wide-angle lenses each having an F-value of F2.75 and a half-angle field-of-view of 38° are shown as other embodiments of the present invention in Tables 1A, 1B, and 2 below. In these examples of data, "Radius of Curvature" (R) denotes positive values when a central position of each of associated spherical surfaces exists at a light exit side (in the light ray diagrams, a traveling direction of light) of each lens surface, or negative values when the central position exists at an opposite side. "Intersurface Distance" denotes a distance from the surface of the lens to a surface of the next lens, on an optical axis. The blank fields under "Glass Material" denote air (refractive index=1), and "Aperture" denotes an effective radius of each lens surface. An aspherical shape is expressed in terms of sag Z in a direction of an optical axis. The sag Z is defined as below by numerical expression 1 when a height above the optical axis is taken as "y", a paraxial radius of curvature, as R, a cone constant as K, and coefficients of the fourth-order, sixth-order, eighth-order, and tenth-order aspherical terms, as A, B, C, and D, respectively:

$$Z = (y^2/R)/\{1+\{1-(K+1)y^2/R^2\}^{1/2} + A \cdot y^4 + B \cdot y^6 + C \cdot y^8 + D \cdot y^{10}$$ (Numerical expression 1)

A light-ray diagram of the projection lens unit 22 used with the reflection-type light valve as an object surface is shown in FIG. 3A. An associated spot diagram is shown in FIG. 3B. An associated aberration diagram is shown in FIG. 6A. In FIG. 3A, the flat plates 17' and 18' of the same thickness that are equivalent to the wire-grid polarized-beam splitter 17 and the astigmatism correction element 18 are provided beforehand to clearly describe the occurrence and correction of astigmatism. The left/right end in each of FIGS. 5A to 5C refers to an end of the X-axis in either a positive or negative thereof.

A light-ray diagram obtained when the wire-grid polarized-beam splitter 17 having a thickness of $2 \times 10^{-3}$ m (2 mm) is disposed obliquely at 45 degrees in an X-Z section is shown in FIG. 3B. An associated spot diagram is shown in FIG. 5B. An associated aberration diagram is shown in FIG. 6B. Since, in FIG. 3B, the wire-grid polarized-beam splitter 17 is disposed obliquely at 45 degrees in the X-Z section, the spot diagram of FIG. 5B is shown in spread form in an X-direction and the aberration diagram of FIG. 6B shows great amounts of aberration of "X-FAN" which represents the aberration in the X-Z section (lateral aberration in the direction of the X-axis). "Y-FAN" refers to the aberration in the Y-Z section (lateral aberration in a direction of a Y-axis).

FIG. 4 is a schematic diagram of the cylindrical lens 18A as the astigmatism correction element disposed between the wire-grid polarized-beam splitter 17 and the projection lens unit 22. More specifically, in terms of shape, the cylindrical lens 18A has, as will be obvious from Table 2, a radius of curvature of $951.01 \times 10^{-3}$ m (951.01 mm) in the X-Z section of FIG. 4, and an optical axis of the cylindrical lens exists at a position of about $9.06 \times 10^{-3}$ m (9.06 mm) at a negative side of the X-axis (i.e., on the paper of FIG. 4, underside).

A method of astigmatism correction using the cylindrical lens 18A is described below. In Table 2, since the optical axis shifts on surface S5, an "Insertion Surface" is provided immediately after surface S6 to return the optical axis.

TABLE 2

| | Radius of Curvature (mm) | | Eccentricity (mm) | | Interface Distance | Glass |
|---|---|---|---|---|---|---|
| Surface | Y-Z Section | X-Z Section | Y-axis | X-axis | (mm) | Material |
| S4 (Surface of Revolution) | ∞ | | 0 | | 14.55 | |
| S5 | ∞ | 951.014 | 0 | −9.060 | 2 | BSC7 HOYA |
| S6 | ∞ | ∞ | 0 | 0 | 0 | |
| Insertion Surface | ∞ | ∞ | 0 | 9.060 | 1 | |
| S7 | 39.674 | | 0 | | 6.04 | FDS90 HOYA |

The 45-degree disposition of the wire-grid polarized-beam splitter 17 is equivalent to a state in which the element 17 is rotated clockwise in FIG. 4. This means a positional relationship in which, at the negative side of the X-axis, a distance between the reflection-type light valve and the wire-grid polarized-beam splitter decreases and, at the positive side of the X-axis, a distance between the projection lens unit and the wire-grid polarized-beam splitter decreases.

The fluxes of light that have exited from each point of the reflection-type light valve 21 pass through the obliquely disposed wire-grid polarized-beam splitter 17, and the rays shift to the negative side of the X-axis. To correct the shift of the rays, the eccentric cylindrical lens 18A is disposed as an astigmatism correction element formed thinly at the positive side of the X-axis and thickly at the negative side thereof. An inclination of a surface of the cylindrical lens 18A takes, on an optical axis of the projection lens unit, an inverse sine of the value obtained by dividing a distance from an optical axis of the cylindrical lens surface, by the radius of curvature of the cylindrical lens. That is, the inclination is expressed as $\sin^{-1}(9.06/951.01)=0.55°$. Similarly, inclinations of the cylindrical lens surface at the left and right ends of the reflection-type light valve 21 at an X-coordinate of $X=\pm 8.832\times 10^{-3}$ m ($\pm 8.832$ mm) each take an inverse sine of the value obtained by dividing $9.06\pm 8.832\times 10^{-3}$ m ($9.06\pm 8.832$ mm) by $951.01\times 10^{-3}$ m (951.01 mm). Thus, 1.08° and 0.01° can be obtained. This means that the inclinations of the cylindrical lens surface at X-coordinates associated with the center and left/right ends of the reflection-type light valve take the values of 1.08°, 0.55°, and 0.01°, respectively.

The reason why the eccentric cylindrical lens 18A is used as an astigmatism correction element in the present embodiment is that since a reference pupil distance at the reflection-type light valve side of the projection lens unit 22 is about $2,088\times 10^{-3}$ m (2,088 mm), the principal light ray that has exited from the left/right end $X=\pm 8.832\times 10^{-3}$ m ($\pm 8.832$ mm) of the reflection-type light valve 21 has an angle of $\tan^{-1}(\pm 8.832/2,088)=0.24°$. Because of this angle, an incident angle at which the rays enter the wire-grid polarized-beam splitter from the reflection-type light valve differs between incidence on a position close to the reflection-type light valve and incidence on a position distant therefrom. This difference appears as asymmetry in the X-Z section, thus giving eccentricity to the cylindrical lens that is the astigmatism correction element. In addition, the eccentricity of the cylindrical lens yields sag of $0.043\times 10^{-3}$ m (0.043 mm) at a crossing point with respect to the optical axis of the projection lens unit 22.

As the diagrams that show correction results on astigmatism due to the use of the cylindrical lens 18A, a light-ray diagram is shown in FIG. 3C, a spot diagram, in FIG. 5C, and an aberration diagram, in FIG. 6C. Spot diagram performance associated with the state existing before the wire-grid polarized-beam splitter was inclined, i.e., before the astigmatism occurs, is attained as in the spot diagram. Aberration diagram performance comparable with that of the state existing before the wire-grid polarized-beam splitter was inclined, i.e., before the astigmatism occurs, is attained as in the aberration diagram. It can be confirmed from the spot diagram and the aberration diagram that the X-axial astigmatism is corrected.

X-axial shifts in position have been calculated to find that in FIG. 3B showing an uncorrected state of the astigmatism, an X-axial shift at a screen side is $42\times 10^{-3}$ m (42 mm) and that in FIG. 3C showing a corrected state of the astigmatism, the X-axial shift at the screen side is $34\times 10^{-3}$ m (34 mm). These quantities, when converted into those obtained at the reflection-type light valve side, become X-axial shifts of $0.67\times 10^{-3}$ m (0.67 mm) and $0.53\times 10^{-3}$ m (0.53 mm). As described above, the use of the eccentric cylindrical lens corrects Z-axial astigmatism and at the same time, improves X-axial astigmatism from $0.67\times 10^{-3}$ m (0.67 mm) to $0.53\times 10^{-3}$ m (0.53 mm).

For a single-plate scheme using one reflection-type light valve, it suffices just to adjust a position of the projection lens unit or liquid-crystal projector apparatus with the screen position as a reference. However, for a three-plate scheme that uses three reflection-type light valves for red (R), green (G), and blue (B), since an adjusting direction is defined, each of the reflection-type light valves is to be moved X-axially through $0.53\times 10^{-3}$ m (0.53 mm) for adjustment.

Next, a second example in which a cylindrical lens is used as an astigmatism correction element is described below.

Figure 7:
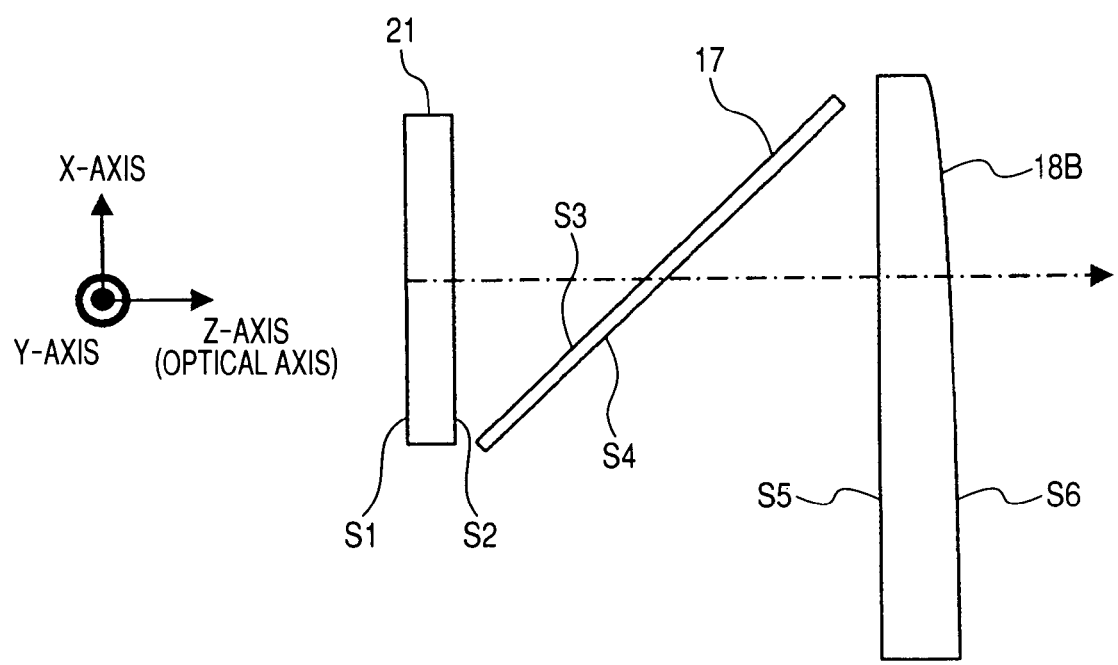
FIG. 7 is a schematic diagram of another cylindrical lens used as astigmatism correction element.

FIG. 7 is a schematic diagram of the cylindrical lens as a second embodiment of the astigmatism correction element. A projection lens unit 22 is of the same lens data as that listed in Table 1 for the above-described first embodiment. Table 3 lists lens data (changes only) on a cylindrical lens 18B used as the astigmatism correction element of FIG. 7.

TABLE 3

| Surface | Radius of Curvature (mm) | | Eccentricity (mm) | | Interface Distance (mm) | Glass Material |
|---|---|---|---|---|---|---|
| | Y-Z Section | X-Z Section | Y-axis | X-axis | | |
| S4 (Surface of Revolution) | ∞ | | 0 | | 14.55 | |
| S5 | ∞ | ∞ | 0 | −9.776 | 2 | BSC7 HOYA |
| S6 | ∞ | −1016.28 | 0 | 0 | 0 | |
| Insertion Surface | ∞ | ∞ | 0 | 9.776 | 1 | |
| S7 | 39.674 | | 0 | | 6.04 | FDS90 HOYA |

In the above first embodiment, the cylindrical lens 18A has its surface provided at the side facing the wire-grid polarized-beam splitter 17, whereas in the second embodiment, the cylindrical lens surface is provided at an opposite side, i.e., at the projection lens unit side.

Figure 8A:
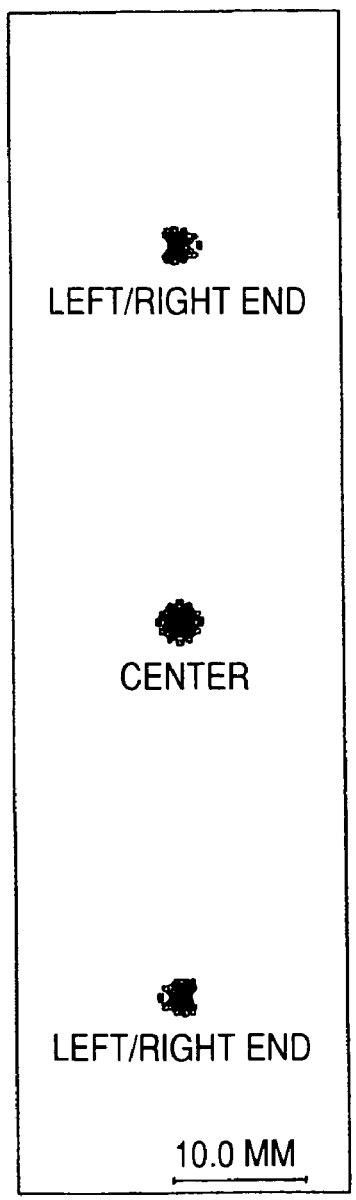
FIGS. 8A, 8B, and 8C are spot diagrams showing light rays before and after application of the cylindrical lens in FIG. 7.
Figure 8B:
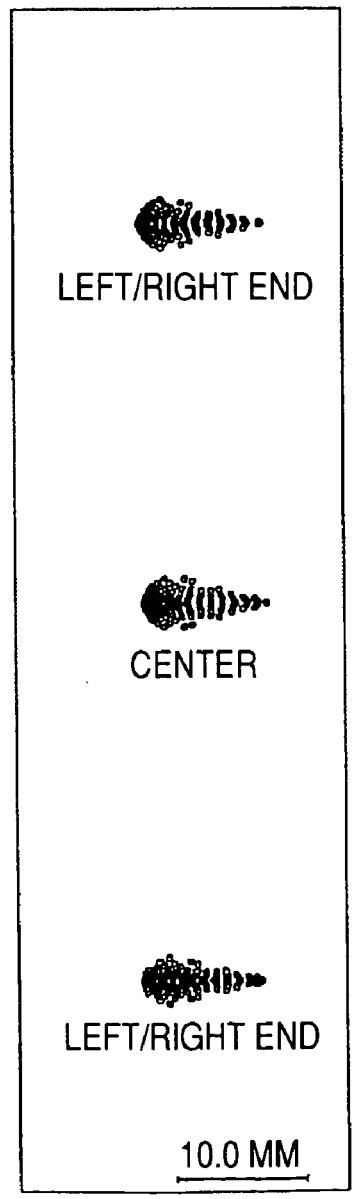
Figure 8C:
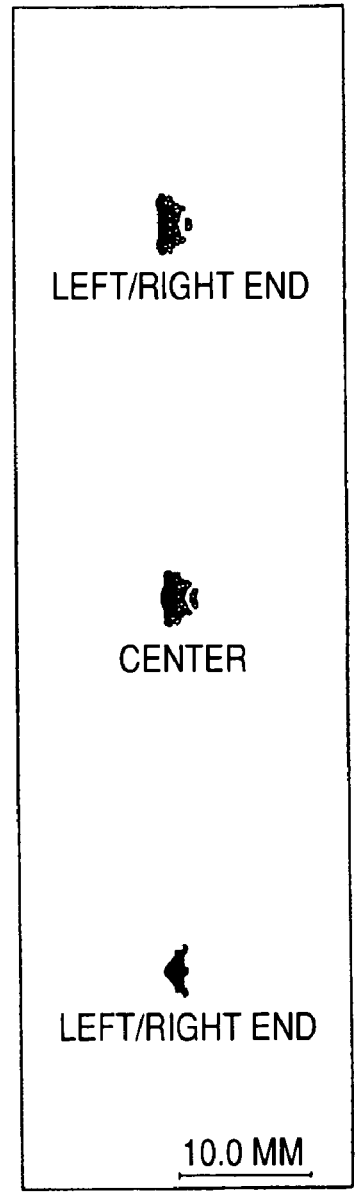
Figure 9A:
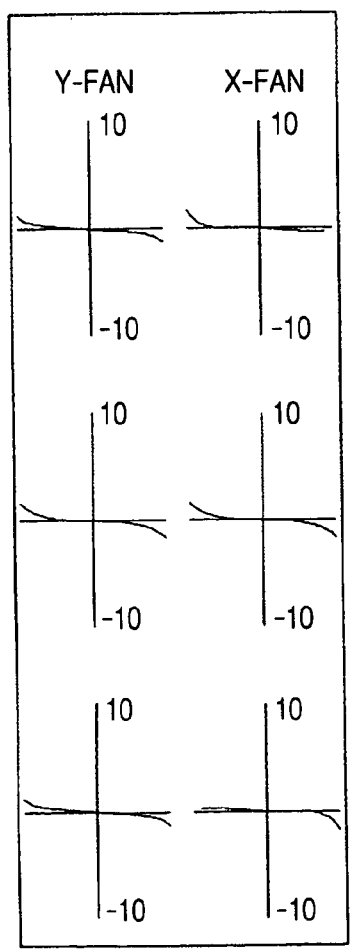
FIGS. 9A, 9B, and 9C are diagrams showing the aberration occurring before and after the application of the cylindrical lens in FIG. 7.
Figure 9B:
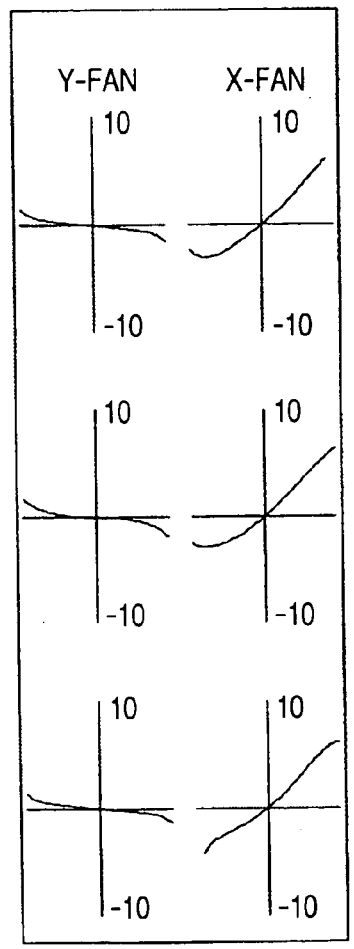
Figure 9C:
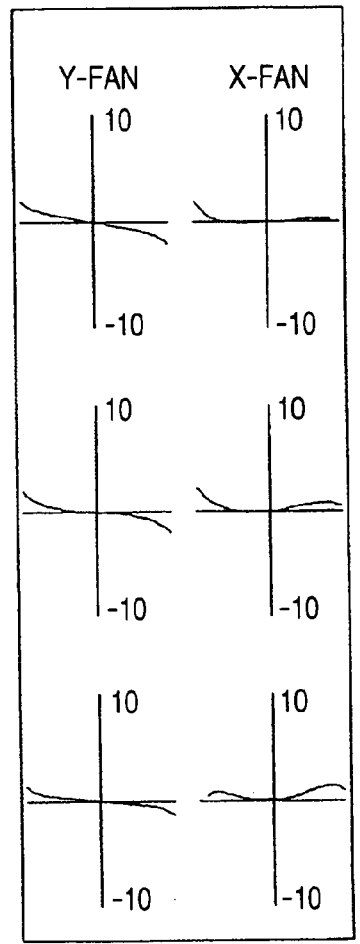

Spot diagrams associated with the second embodiment are shown in FIGS. 8A to 8C, and aberration diagrams, in FIGS. 9A to 9C. The spot diagrams and aberration diagrams showing the states existing before and after the occurrence of the astigmatism exhibit almost the same patterns as those of the first embodiment. Only the corrected states shown in the spot diagram of FIG. 5C or 8C and in the aberration diagram of FIG. 6C or 9C differ between the spot diagrams of FIGS. 5A to 5C or 8A to 8C and the aberration diagrams of FIGS. 6A to 6C or 9A to 9C.

In FIG. 7, the fluxes of light that have exited from each point of a reflection-type light valve 21 pass through the wire-grid polarized-beam splitter 17 disposed with a plane inclined to an optical axis, and the rays shift to a negative side of an X-axis. To correct the shift of the rays, the eccentric cylindrical lens 18B is disposed as an astigmatism correction element formed thinly at a positive side of the X-axis and thickly at the negative side thereof. An inclination of a surface of the cylindrical lens 18B takes, on an optical axis of a projection lens unit, an inverse sine of the value obtained by dividing a distance from an optical axis of the cylindrical lens surface, by a radius of curvature of the cylindrical lens. That is, the inclination is expressed as $\sin^{-1}(9.776/1016.28)=0.55°$. Similarly, inclinations of the cylindrical lens surface at both left and right ends of the reflection-type light valve 21 at an X-coordinate of $X=\pm 8.832\times 10^{-3}$ m ($\pm 8.832$ mm) each take an inverse sine of the value obtained by dividing $9.776\pm 8.832\times 10^{-3}$ m ($9.776\pm 8.832$ mm) by $1016.28\times 10^{-3}$ m (1016.28 mm). Thus, 1.05° and 0.05° can be obtained. This means that the inclinations of the cylindrical lens surface at X-coordinates associated with the center and left/right ends of the reflection-type light valve take the values of 1.05°, 0.55°, and 0.05°.

In addition, the eccentricity of the cylindrical lens 18B yields a sag of $0.047 \times 10^{-3}$ m (0.047 mm) at a crossing point with respect to an optical axis of the projection lens unit 22.

As the diagrams that show correction results on astigmatism due to use of the cylindrical lens 18B, a spot diagram is shown in FIG. 8C and an aberration diagram, in FIG. 9C. Spot diagram performance associated with the state existing before the wire-grid polarized-beam splitter was inclined, i.e., before the astigmatism occurs, is attained as in the spot diagram. Aberration diagram performance comparable with that of the state existing before the wire-grid polarized-beam splitter was inclined, i.e., before the astigmatism occurs, is attained as in the aberration diagram.

Next, a liquid-crystal projector apparatus using the cylindrical lens as the astigmatism correction element described in FIG. 4 or 7 is set forth below using FIG. 10.

Referring to FIG. 10, symbol 11 denotes a light source, symbol 12 denotes a reflector, and symbols 131 and 132 denote a first multi-lens array and a second multi-lens array, respectively, as an integrator. Symbol 14 denotes a flat-plate polarized-light transducer formed of a prism array, symbol 151 denotes a focusing lens, and symbols 152 and 154 denote field lenses. Symbol 153 denotes a relay lens, symbols 161 and 162 denote dichroic mirrors, and symbol 163 denotes a total reflection mirror. Symbols 171, 172, and 173 each denote a wire-grid polarized-beam splitter that transmits P-polarized light and reflects S-polarized light. Symbols 181, 182, and 183 each denote a cylindrical lens, symbols 191 and 193 both a ½-wavelength plate for converting P-polarized light and S-polarized light, and symbol 20 a cross dichroic prism serving as a color synthesizer for conducting color syntheses. Symbols 211, 212, and 213 denote reflection-type light valves. The reflection-type light valves 211, 212, and 213 are driven by a driving circuit (not shown) in accordance with image signals.

After exiting from the light source 11, fluxes of light are reflected by the reflector 12 having a parabolic surface, and become fluxes parallel to an optical axis. The quantities of light on cell surfaces of lenses of the first multi-lens array 131 are superimposed on effective surfaces of the reflection-type light valves 211, 212, 213, by actions of the second multi-lens array 132 and the focusing lens 151. Uniformity of a luminous quantity distribution is thus improved. The field lenses 152, 154 make principal light rays parallel, i.e., generate a telecentricity control action. Further, since an optical path of the reflection-type light valve 213 is longer than those of the other two reflection-type light valves, the relay lens 153 introduces illumination light into the reflection-type light valve 213 whose optical path is longer than those of the other two. Natural light has its polarizing direction adjusted to fit S-polarized light, by the flat-plate polarized-light transducer 14 disposed at the stage following the second multi-lens array.

Next, chromatic splitting is described below. The dichroic mirror 161 reflects blue components of light and transmits the remaining green and red components of the light. Furthermore, the dichroic mirror 162 reflects the green components of the light and transmits the remaining red components. In this fashion, natural light from the light source 11 is chromatically split.

Chromatically split red, green, and blue components of light enter the respective wire-grid polarized-beam splitters 171, 172, 173. The wire-grid polarized-beam splitters 171, 172, 173 are arranged in inclined form at 45 degrees to an optical axis of the light of each color. Color components of S-polarized light reflect with 90° directionality and are irradiated to the reflection-type light valves 211, 212, 213.

When pixels of the reflection-type light valves 211, 212, 213 are in an ON state, the rays existing on optical axes associated with each color, in illumination optics, are converted into P-polarized light. This time, therefore, the rays pass through the wire-grid polarized-beam splitters 171, 172, 173 for each color. The red light flux passes through the ½-wavelength plate 191 disposed on an associated optical path, and is converted into S-polarized light. Similarly, the blue light flux passes through the ½-wavelength plate 193 disposed on an associated optical path, and is converted into S-polarized light. The red and blue light fluxes and the green light flux enter the cross dichroic prism 20 as S-polarized light and P-polarized light, respectively, and the light of the three colors, after being color-synthesized, enters a projection lens unit 22 (not shown). The projection lens unit 22 (not shown) enlarges the color-image light color-synthesized by the cross dichroic prism 20, and projects the light onto a screen (not shown). All the colors of light can be synthesized in P-polarized light form by use of the cross dichroic prism 20, without the ½-wavelength plates 191 and 193 being arranged. The color synthesis using the cross dichroic prism 20, however, deteriorates in efficiency, for which reason, such a polarized state as in the figure is desirable.

As described above, when the wire-grid polarized-beam splitters arranged along an optical path on which the exit light fluxes from the reflection-type light valves are directed toward the projection lens unit are arranged so that incident light from the illumination optics is reflected in a 90° direction and let into the reflection-type light valves to make the exit light therefrom pass through, the astigmatism occurring during the passage through the wire-grid polarized-beam splitters can be appropriately corrected using the astigmatism correction elements provided between the wire-grid polarized-beam splitters and the projection lens unit. It is thus possible to provide a liquid-crystal projector apparatus excellent in image-resolving performance and inheriting the conventional basic configuration.

In FIG. 10, a direction of the cylindrical lens 183 for blue can be reversed if the illumination optics for guiding light to the reflection-type light valve 213 is configured so as to make the light enter from an opposite side to that shown in the figure (i.e., from a downward position of the figure). Accordingly, the cylindrical lenses for the three colors can be made to face in the same optical direction, with the result that the cylindrical lenses for the three colors can also be made into common specifications and arranged between the cross dichroic prism 20 and the projection lens unit 22.

Liquid-crystal projector apparatus required to satisfy stringent specifications relating to chromatic differences in magnification typically has, between a reflection-type light valve 21 and a cross dichroic prism 20, a color correction lens for correcting chromatic differences in magnification. Therefore, the correction lens for correcting chromatic differences in magnification may also be integrally held or formed with an astigmatism correction element.

What is claimed is:

1. A projection image display apparatus for irradiating light in a polarized and converted form from a light source onto a light valve, forming an optical image in response to image signals, and providing enlarged projection of the optical image, said apparatus comprising:

a flat-plate-shaped wire-grid polarized-beam splitter disposed with a plane inclined at an angle of about 45° to an incident optical axis, wherein said polarized-beam splitter splits, by beams of transmission or reflection, the light modulated by said light valve and having formed the optical image;

a projection lens unit which projects in an enlarged fashion the optical image;

an astigmatism correction element which corrects astigmatism of the optical image; and a driving circuit which drives said light valve;

wherein said astigmatism correction element is disposed between said polarized-beam splitter and said projection lens unit and comprises a lens of which one side distant from said projection lens unit is thicker than another side close said projection lens unit, and further of which optical axis is eccentric towards said side distant from said projection lens unit.

2. A projection image display apparatus, comprising:

a polarized-light converter which adjusts a direction of polarization of light from a light source and forming the light into P-polarized light or S-polarized light;

a beam splitter which splits the polarized light converted by said polarized-light converter into red (R), green (G), and blue (B) components the polarized light converted by said polarized-light converter;

a reflection-type light valve onto which the polarized light split by said beam splitter is irradiated, said light valve modulating the polarized light in accordance with image signals;

a flat-plate-shaped wire-grid polarized-beam splitter disposed with a plane inclined at an angle of about 45° to an incident optical axis, said polarized-beam splitter reflecting the RGB components of the polarized light split by said beam splitter and irradiating the polarized light onto said reflection-type light valve, and further splitting the reflected light modulated by said reflection-type light valve and having formed an optical image, by means of transmission or further reflection;

an astigmatism correction element which corrects astigmatism of the optical image formed by the light split by said polarized-beam splitter;

a color-composer which composes the RGB components of the polarized light outputted from said astigmatism correction element;

a projection lens unit which projects in an enlarged fashion the optical image; and a driving circuit which drives said light valve;

wherein said astigmatism correction element is disposed between said polarized-beam splitter and said projection lens unit and comprises a lens of which one side distant from said projection lens unit is thicker than another side close to said projection lens unit and further of which optical axis is eccentric towards said side distant from said projection lens unit.

3. The projection image display apparatus according to claim 1, wherein said astigmatism correction element is held integrally with a convex lens for correcting chromatic differences in magnification.

4. The projection image display apparatus according to claim 2, wherein said astigmatism correction element is held integrally with a convex lens for correcting chromatic differences in magnification.

5. An optical unit for a projection image display apparatus which irradiates light in a polarized and converted form from a light source onto a light valve, forms an optical image in response to image signals, and provides an enlarged projection of the optical image, said optical unit comprising:

a flat-plate-shaped wire-grid polarized-beam splitter disposed with a plane inclined at an angle of about 45° to an incident optical axis, wherein said polarized-beam splitter splits, by means of transmission or reflection, the light modulated by said light valve and having formed the optical image;

a projection lens unit which projects in an enlarged fashion the optical image; and an astigmatism correction element which corrects astigmatism of the optical image formed by the light split by said polarized-beam splitter;

wherein said astigmatism correction element is disposed between said polarized-beam splitter and said projection lens unit and comprises a lens of which one side distant from said projection lens unit is thicker than another side close to said projection lens unit and further of which optical axis is eccentric towards said side distant from said projection lens unit.

6. The optical unit according to claim 5, wherein said astigmatism correction element is held integrally with a convex lens for correcting chromatic differences in magnification.

7. The projection image display apparatus according to claim 1, wherein the optical axis of said astigmatism correction element is disposed perpendicular to the optical axis of said light source.

8. The projection image display apparatus according to claim 2, wherein the optical axis of said astigmatism correction element is disposed perpendicular to the optical axis of said light source.

9. The optical unit according to claim 5, wherein the optical axis of said astigmatism correction element is disposed perpendicular to the optical axis of said light source.

* * * * *